United States Patent
Boyd et al.

[11] Patent Number: 6,150,287
[45] Date of Patent: Nov. 21, 2000

[54] VEHICLE HEADLINER WITH BURLAP LAYERS

[75] Inventors: Stuart G. Boyd, North Street; David R. Damouth, Port Huron; Wesley J. Leonard, Fort Gratiot; Abbas Saleem, Dearborn Heights; Harold G. Wolf, Jr., Gibraltar, all of Mich.

[73] Assignee: Lear Automotive Dearborn, Inc., Southfield, Mich.

[21] Appl. No.: 09/144,665

[22] Filed: Sep. 1, 1998

[51] Int. Cl.[7] ................................................ B32B 5/26
[52] U.S. Cl. .............................. 442/32; 442/9; 442/10; 442/30; 428/31; 296/214
[58] Field of Search .................... 442/9, 10, 30, 442/32; 428/31; 296/214

[56] References Cited

U.S. PATENT DOCUMENTS

| | | |
|---|---|---|
| 3,849,174 | 11/1974 | Ancker . |
| 3,874,964 | 4/1975 | Cogliano . |
| 4,211,590 | 7/1980 | Steward et al. .................. 156/79 |
| 4,363,848 | 12/1982 | Duc et al. ...................... 442/226 |
| 4,430,058 | 2/1984 | Ryan et al. ..................... 432/259 |
| 4,840,832 | 6/1989 | Weinle et al. ................... 428/156 |
| 4,844,849 | 7/1989 | Miller et al. ................... 264/46.4 |
| 5,007,976 | 4/1991 | Satterfield et al. .............. 156/222 |
| 5,056,817 | 10/1991 | Fuller ......................... 280/770 |
| 5,082,716 | 1/1992 | Satterfield et al. .............. 428/175 |
| 5,085,424 | 2/1992 | Wood, Jr. ...................... 472/92 |
| 5,089,328 | 2/1992 | Doerer et al. .................. 428/308.4 |
| 5,169,469 | 12/1992 | Feeley ......................... 156/241 |
| 5,401,449 | 3/1995 | Hill et al. .................... 264/46.4 |
| 5,437,919 | 8/1995 | Welich et al. .................. 428/245 |
| 5,486,256 | 1/1996 | Romesberg et al. ............... 156/251 |
| 5,536,556 | 7/1996 | Juriga ......................... 428/138 |
| 5,549,776 | 8/1996 | Juriga ......................... 156/228 |
| 5,565,259 | 10/1996 | Juriga ......................... 428/138 |
| 5,582,906 | 12/1996 | Romesberg et al. ............... 442/55 |
| 5,804,262 | 9/1998 | Stevens et al. ................. 428/31 |
| 5,888,616 | 3/1999 | Ang ............................ 428/141 |

FOREIGN PATENT DOCUMENTS

| | | |
|---|---|---|
| 0 832 787 | 4/1998 | European Pat. Off. . |
| 2831640 | 7/1978 | Germany ................. B32B 29/02 |
| 0 248 199 | 6/1986 | Germany ................. B32B 5/18 |
| 1 206 593 | 9/1970 | United Kingdom . |

*Primary Examiner*—Elizabeth M. Cole
*Assistant Examiner*—Arti R. Singh
*Attorney, Agent, or Firm*—MacMillan, Sobanski & Todd, LLC.

[57] ABSTRACT

An improved headliner utilizes burlap layers to provide strength to the headliner sandwich. The burlap layers are placed on both sides of a central foam core to create an I-beam construction.

6 Claims, 1 Drawing Sheet

VEHICLE HEADLINER WITH BURLAP LAYERS

BACKGROUND OF THE INVENTION

This invention relates to a vehicle headliner having a sandwich of layers that includes burlap layers sandwiched on each side of a central foam core.

Headliners are provided within vehicles to cover the ceiling of the vehicle. Headliners must perform a variety of functions, and to this end they are manufactured from a number of layers of different materials. The materials are selected and designed to achieve desired functions for the headliners.

As an example, headliners typically have an outer decorative layer to provide a pleasing visual appearance. In addition, the headliners have layers which are intended to absorb sound, thus reducing noise in the vehicle cab. On the other hand, the headliners typically cover a relatively large area, and it is undesirable for the headliner to sag. Thus, layers are typically also provided into the headliner to increase the strength of the headliner.

In one widely manufactured vehicle headliner, the central foam layer is provided with outer fiberglass layers on each face. The decorative cover is then placed outwardly of one of these fiberglass layers. The fiberglass layers in combination with the central core layer create an I-beam construction that provides sufficient strength to the overall headliner body.

However, fiberglass has some undesirable characteristics. As one example, it is somewhat difficult for the vehicle assemblers to handle the fiberglass without irritation.

SUMMARY OF THE INVENTION

In a disclosed embodiment of this invention, a headliner construction incorporates burlap layers on each side of a central foam layer. The burlap layers in combination with the central foam layer provide an I-beam construction. The burlap layer is not irritating to assembly personnel, and thus is an improvement over the prior art.

In a disclosed embodiment of this invention, the burlap is selected to be of a weight between 5.0–9.0 oz. per square yard. Most preferably, the burlap is selected to be approximately 7.0 oz. per yard.

The invention headliner is preferably made of a sandwich of an outer decorative layer, an adhesive layer, a burlap layer, another adhesive layer, a central foam core, another adhesive layer, a second burlap layer, and an outer scrim.

The inventive headliner construction provides benefits over the prior art in that the burlap material is an improvement over the prior art fiberglass.

These and other features and benefits of the present invention can be best understood from the following specification and drawings, the following of which is a brief description.

DETAILED DESCRIPTION OF A PREFERRED EMBODIMENT

Figure 1:
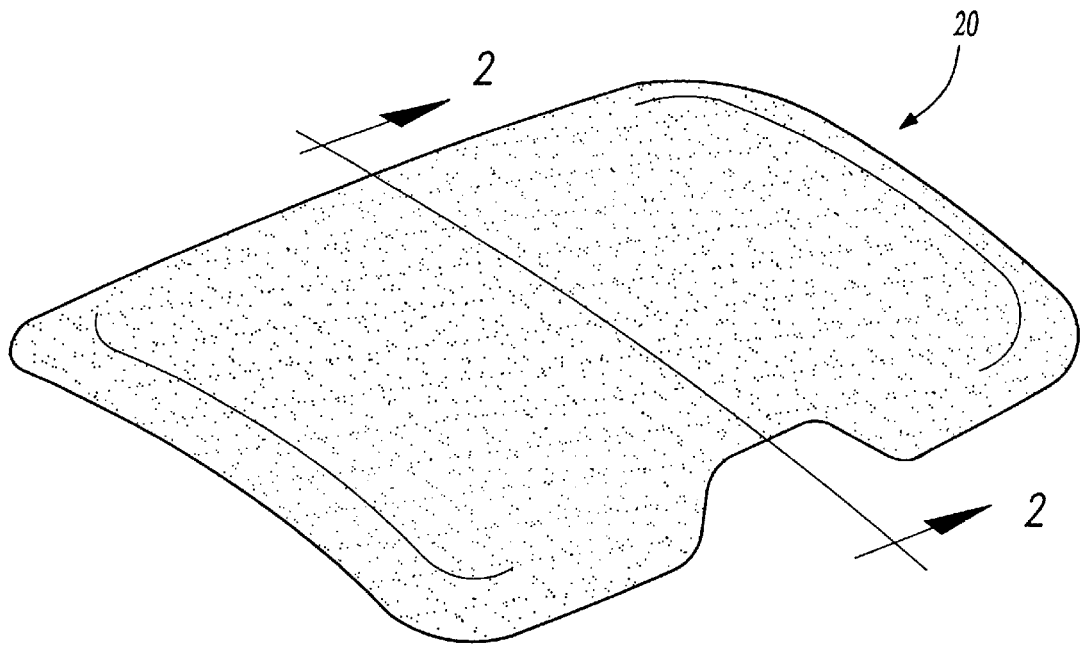
FIG. 1 is a perspective view of a vehicle headliner.

FIG. 1 shows a vehicle headliner 20. As known, the headliner is to be mounted in the interior of a vehicle and cover the ceiling of the vehicle.

Figure 2:
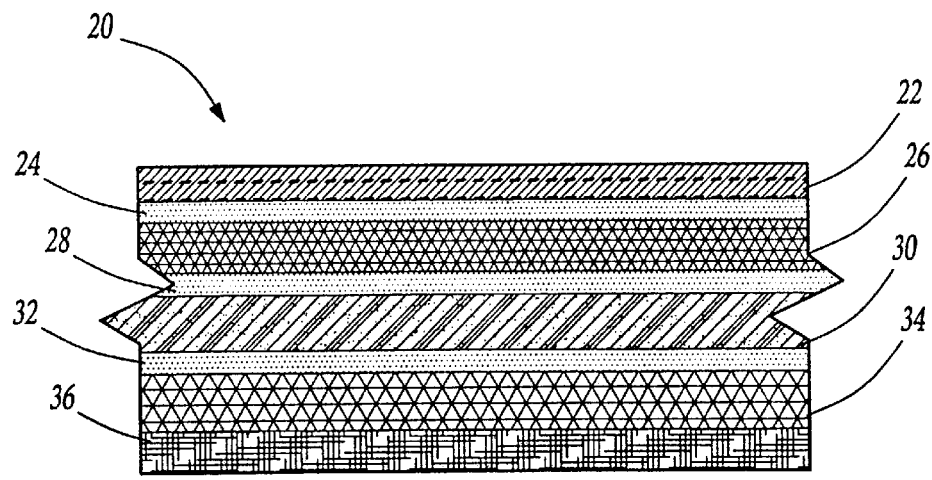
FIG. 2 is a cross-sectional view through the vehicle headliner of the present invention.

FIG. 2 shows the construction of headliner 20. An outer decorative layer 22 is placed on an adhesive layer 24. A burlap layer 26 is placed between the adhesive layer 24 and another adhesive layer 28. A central foam core 30 is placed on the other side of the adhesive layer 28. Another adhesive layer 32 is placed on the opposed side of the foam core 30 and a second burlap layer 34 is placed on the opposed side of adhesive layer 32. A scrim layer 36 is placed outwardly of the burlap layer 34. The adhesives are preferably thermosetting resins.

Preferably, the sandwich of layers are stacked together, and placed into a heated mold. The heated mold is heated to approximately 300° F. on each side. The sandwich is compression molded within the mold for approximately 50 seconds. This will assist the thermosetting adhesives in being fully reacted. The hot composite is taken from the mold and placed on a cooling fixture, preferably with suction. Once the composite has cooled to approximately 90–100° F., it may be removed. It is then taken to a trim operation.

Most preferably, the adhesives are thermosetting adhesives, and preferably at least layers 28 and 32 are applied by roll coating to the foam core layer 30. The adhesive is preferably deposited to a weight of approximately 1.5 oz. per square yard on both sides of the foam core. The backing scrim is preferably utilized to prevent an adhesive from squeezing through to the mold.

The combination of the burlap layers with the central foam layer provides an I-beam construction that provides sufficient strength to the headliner. On the other hand, the use of the natural fiber burlap provides a more acceptable headliner material.

A worker of ordinary skill in the art would recognize modifications of the invention disclosed in this application would come within the scope of this patent. For that reason, the following claims should be studied to determine the true scope and content of this patent.

What is claimed is:

1. A headliner comprising:
   a. an outer decorative layer;
   b. adhesive on an inner face of said outer decorative layer;
   c. a first burlap layer secured to said outer decorative layer by said adhesive;
   d. adhesive on an opposed face of said first burlap layer from said outer decorative layer;
   e. a foam core secured to said first burlap layer by adhesive;
   f. adhesive placed on an opposed side of said foam core from said first burlap layer;
   g. a second burlap layer secured to said foam core by said adhesive; and
   h. a scrim layer placed on an opposed side of said second burlap layer from said foam core.

2. A headliner as recited in claim 1, wherein said burlap layers have a weight between 5–9 oz. per square yard.

3. A headliner as recited in claim 1, wherein said burlap layers have a weight of 7 oz. per square yard.

4. A headliner comprising:
   a. an outer layer;
   b. a first burlap layer secured to said outer layer;
   c. a foam core secured to said first burlap layer on an opposed face of said first burlap layer from said outer layer;
   d. a second burlap layer secured to said foam core on an opposed side of said foam core from said outer layer; and e. a scrim layer placed on an opposed side of said second burlap layer from said foam core.

5. A headliner as recited in claim 4, wherein said burlap layers have a weight between 5–9 oz. per square yard.

6. A headliner as recited in claim 4, wherein said burlap layers have a weight of 7 oz. per square yard.

* * * * *